United States Patent
Kundermann et al.

(10) Patent No.: US 6,378,675 B1
(45) Date of Patent: Apr. 30, 2002

(54) CLUTCH DEVICE WITH A HYDRODYNAMIC CLUTCH AND AT LEAST TWO FRICTION CLUTCHES

(75) Inventors: Wolfgang Kundermann, Schweinfurt; Jörg Sudau, Niederwerrn, both of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/678,439

(22) Filed: Oct. 2, 2000

(30) Foreign Application Priority Data

Sep. 30, 1999 (DE) .......................................... 199 46 857
Nov. 17, 1999 (DE) .......................................... 199 55 365
Feb. 1, 2000 (DE) .......................................... 100 04 286

(51) Int. Cl.[7] ............................................. F16D 21/06
(52) U.S. Cl. ........................ 192/3.27; 192/48.9; 192/57
(58) Field of Search ............................. 192/3.25, 3.27, 192/48.1, 48.8, 48.9, 57

(56) References Cited

U.S. PATENT DOCUMENTS

| | | | |
|---|---|---|---|
| 2,642,168 A | * 6/1953 | Black et al. ................... | 192/3.2 |
| 3,188,885 A | 6/1965 | Fisher | |
| 3,625,323 A | * 12/1971 | Hetmann .................... | 192/3.26 |
| 4,289,044 A | 9/1981 | Dorpmund et al. | |
| 4,881,417 A | 11/1989 | Yoshii et al. | |
| 4,966,270 A | 10/1990 | Rispeter et al. | |
| 5,094,331 A | 3/1992 | Fujimoto et al. | |
| 5,101,953 A | 4/1992 | Payvar | |
| 5,669,474 A | 9/1997 | Dehrmann et al. | |
| 5,782,326 A | * 7/1998 | Souza ......................... | 192/3.26 |
| 5,887,690 A | 3/1999 | Haupt | |
| 5,890,392 A | 4/1999 | Ludanek et al. | |
| 6,148,974 A | * 11/2000 | Matsue et al. .............. | 192/3.21 |

FOREIGN PATENT DOCUMENTS

| | | |
|---|---|---|
| DE | 921 735 | 12/1954 |
| DE | 4 444 242 | 6/1965 |
| DE | 37 40 581 A1 | 11/1988 |
| DE | 38 19 702 A1 | 12/1989 |
| DE | 43 32 466 C2 | 3/1995 |
| DE | 44 15 664 A1 | 11/1995 |
| DE | 44 32 624 C1 | 4/1996 |
| DE | 44 32 624 | 4/1996 |
| DE | 196 50 039 A1 | 6/1997 |
| DE | 19 650 040 | 6/1997 |
| DE | 196 31 983 | 2/1998 |
| DE | 198 00 490 A1 | 8/1998 |
| DE | 198 33 376 A1 | 12/1999 |
| DE | 198 33 377 A1 | 12/1999 |
| DE | 198 33 378 A1 | 12/1999 |
| EP | 319 747 | 6/1989 |
| EP | 0 931 951 A1 | 7/1999 |
| FR | 1 043 006 | 11/1953 |
| GB | 1 331 048 | 9/1973 |
| GB | 1 360 454 | 7/1974 |
| GB | 2 036 203 | 6/1980 |
| GB | 2 308 426 | 6/1997 |

* cited by examiner

Primary Examiner—Charles A Marmor
Assistant Examiner—Saúl Rodríguez
(74) Attorney, Agent, or Firm—Cohen, Pontani, Lieberman & Pavane (57) ABSTRACT

A clutch device which serves to connect the drive) of a motor vehicle with a multiple-speed shift transmission has, for this purpose, two friction clutches which can be engaged or disengaged independently from one another in that they are connected via their respective driven sides with a transmission input shaft. At least one of the friction clutches is in a working connection at its drive side with a driving member of a hydrodynamic clutch which can be activated at least under predetermined operating conditions of the drivetrain for transmitting torque introduced by the drive. At the same time, a driven member of the hydrodynamic clutch can be connected with one of the transmission input shafts.

36 Claims, 3 Drawing Sheets

CLUTCH DEVICE WITH A HYDRODYNAMIC CLUTCH AND AT LEAST TWO FRICTION CLUTCHES

BACKGROUND OF THE INVENTION

1. Field of the Invention

The invention is directed to a clutch device for connecting a motor vehicle drive with a multiple-speed transmission via at least two friction clutches which are connected with associated shift transmission input shafts by respective driven sides such that the clutches can be engaged or disengaged independently of one another.

2. Description of the Related Art

A clutch device of this kind is known, for example, from EP 0 931 951 A1. The clutch device serves to connect the drive of a motor vehicle with a multiple-speed transmission via two friction clutches which are preferably automatically actuated, a clutch release system being associated with each of these friction clutches so that the two friction clutches can be engaged or disengaged independently from one another. One of the friction clutches is arranged on a central transmission input shaft so as to be fixed with respect to rotation relative to it, while the other friction clutch engages at a second transmission input shaft so as to be fixed with respect to rotation relative to it, this second transmission input shaft, constructed as a hollow shaft, enclosing the central transmission input shaft. Clutch devices of this type, which are known in technical circles as "double clutches", particularly when combined with a multiple-speed shift transmission, offer the possibility of carrying out shifting processes between two respective gear ratio speeds of the transmission without interruption of tractive forces.

The laid open application cited above addresses not only the advantages of such a clutch device, but also indicates the actual problem, albeit only indirectly: It is stated, for example, that both clutch disks can be acted upon jointly during particularly difficult starting processes. Such starting processes occur, for example, when the accelerator pedal is deflected to the region of its stop, while the motor vehicle is kept essentially stationary at the same time by applying the maximum braking force until the clutch has reached its optimal transmission point which, when exceeded, would cause the drive to stall. If the braking action is canceled at this time, the vehicle is started with maximum acceleration. While starting processes of this kind are common primarily in car racing, they may be required particularly in motor vehicles with a relatively weak engine under extreme starting conditions, for example, when starting on an obstruction. This results in high slippage which brings about extensive development of heat. Consequently, not only is there the problem that this heat must be carried away from the area of extension of the friction clutch, but increased wear of the friction clutches must also be taken into account. Further, heating of this kind leads to changes in the coefficient of friction at the friction clutches so that the control of the two release mechanisms, and therefore of the two friction clutches relative to one another, can be appreciably impaired. This is incompatible with a problem-free torque transmission in shifting processes in the shift transmission without interruption of tractive force and without jerking during shifting. Specifically, as a result of inaccuracies in functional matching of the two friction clutches relative to one another caused by heat, a torque ratio not intended in the shifting process is applied to the two transmission input shafts, which can lead to shifting processes in the shift transmission under load. This can overtax the synchronization in the shift transmission so that, aside from the disadvantages with respect to efficiency, the shift transmission can be damaged to the point of complete failure.

Also problematic in clutch devices of this kind are starting processes which are either carried out in opposition to an inclination, wherein the motor vehicle must be prevented from rolling backward, or which are used when parking at the lowest possible speed for precise positioning of the motor vehicle in a parking space. The first operating state mentioned above is referred to in technical circles as "hill-holding", the latter operating state is referred to as "creeping". Both starting processes have in common that the friction clutch is operated, sometimes without actuation of the accelerator, over longer period of time with slippage. Although the torques to be transmitted in such starting processes lie well below those in the operating condition described above, an intensive heating of the friction clutches can occur, resulting in the problems detailed above.

Gear-shifting strategies and shifting processes for double-clutch transmissions based on the aimed for adjustment of clutch slip have been suggested (German reference DE 196 31 983 C1) with consequent generation of friction heat. Depending on driving behavior, overheating problems of the type mentioned above cannot be ruled out.

The risk of intensive overheating exists not only in a dry friction clutch, but can also occur in so-called "wet" friction clutches, preferably in the form of a disk or plate clutch which is arranged within a viscous medium such as hydraulic fluid. In this connection, reference is had to German reference DE 198 00 490 A1, for example, in which two plate clutches are arranged in viscous medium, one being provided for forward driving and the other for driving in reverse. The object of German reference DE 198 00 490 A1 is adequate cooling of wet friction clutches of this type, the viscous medium being utilized for this purpose. However, in spite of the liquid cooling, heating of the friction clutches constitutes a considerable problem because, on the one hand, the viscous medium overheats when flowing through flow passages in the form of channels usually provided in friction surfaces of the friction clutch and can accordingly be destroyed and, on the other hand, due to the building up of an opposing pressure between the friction surfaces of two adjacent plates with intensive flow through these grooves, capacity of the friction clutch to transmit torque is reduced and the problem of overheating is therefore exacerbated due to increased slippage. Particularly in plate clutches, this problem can result in that the friction surfaces can no longer separate from one another completely after a disengaging process and, consequently, considerable drag torques can sometimes reach the shift transmission because one of the friction clutches is already closed, while the other has not yet completely opened.

SUMMARY OF THE INVENTION

It is the object of the invention to construct a clutch device in such a way that an intensive heating is prevented in the area of the friction clutches even under unfavorable operating conditions such as in problematic starting processes in a motor vehicle.

This object is met according to the invention by producing an operative connection between one of the friction clutches and a hydrodynamic clutch, the latter can be activated as a substitute for the friction clutch that is in a working connection with the hydraulic clutch during difficult starting processes such as, for example, when overcoming obstacles, when starting on hills using the "hill-holder" function and when "creeping" for parking the motor vehicle in a narrow parking space. In this respect, the hydrodynamic clutch is advantageous in a two-fold sense: first, while starting processes with a hydrodynamic clutch, even under full load, lead to a temporally limited relative movement of the driving member—usually formed by an impeller wheel—with respect to the driven member having a turbine wheel and therefore result in losses for reasons pertaining to flow, the heat development occurring in this connection remains within strict boundaries, especially since the transmission of torques in hydrodynamic clutches of this type entails a comparatively high volume flow of viscous medium circulating between the impeller wheel and turbine wheel. As soon as the turbine wheel has almost reached the rotational speed of the impeller wheel, the hydrodynamic clutch operates with comparatively low losses. Consequently, by connecting the driven member of the hydrodynamic clutch, that is, the turbine wheel, with the driven side of one of the friction clutches and with one of the transmission input shafts of the shift transmission, the torque provided by a drive unit can be transmitted directly to this transmission input shaft by circumventing the friction device connected with the hydrodynamic clutch. The transmission input shaft takes part in the above-described acceleration of the turbine wheel by means of the impeller wheel by way of the volume flow of viscous medium running therebetween. The corresponding friction clutch is either disengaged during the activation of the hydrodynamic clutch or is operated in combination with the hydrodynamic clutch in order to distribute the output loss to two clutches with a distribution ratio which can be predetermined.

In case the friction clutches are arranged with a radial offset relative to one another to economize on axial installation space, it is advantageous to connect the radially outermost friction clutch with the hydrodynamic clutch. The reason for this is as follows: The hydrodynamic clutch is preferably connected with the transmission input shaft to which the highest torques can be applied, that is, with that transmission input shaft to which the first gear speed and the reverse gear are allocated. Because of this, in a shift transmission with two transmission input shafts, the distribution is preferably effected such that gear speeds 1, 3 and 5 and the reverse gear are allocated to the first transmission shaft cooperating with the hydrodynamic clutch and gear speeds 2, 4 and 6—in a six-speed shift transmission—are allocated to the second transmission input shaft.

In contrast to extreme starting processes such as starting under full load or with the "hill-holder" or "creep" function, simple starting processes can be carried out by circumventing the hydrodynamic clutch by means of one of the friction clutches. Since the radial outer friction clutch in comparison to the friction clutch arranged farther radially inside—assuming an identical number of plates in both friction clutches—is better suited for transmitting higher torques than friction clutches located farther inward radially, the radial outermost friction clutch is preferably connected with the transmission input shaft at which the hydrodynamic clutch also engages. Accordingly, a simple starting process can be carried out with this friction clutch, so that the efficiency of the clutch device and therefore of the entire drive train which, aside from the clutch device, also comprises the drive and the shift transmission, is increased compared with a construction of the clutch device in which every starting process is carried out via the hydrodynamic clutch.

An alternative torque transmission via the hydrodynamic clutch or via one of the friction clutches requires that all clutches can be switched on or off regardless of whether or not they are hydrodynamic clutches or friction clutches. In the latter case, for this purpose, a working connection is established or canceled between friction surfaces of adjacent clutch members such as the outer plates and inner plates of a multiple-plate clutch. In contrast, the hydrodynamic clutch can be shifted as described in the following:

To deactivate the hydrodynamic clutch, it is possible to throttle down or even halt a volume flow of viscous medium which, when the hydrodynamic clutch is activated, is preferably guided via a flow inlet provided at its radial inner side into the hydrodynamic circuit, while the possibility is provided at the same time on the radial outer side for viscous medium contained in the hydrodynamic circuit to flow off quickly. For this reason, the hydrodynamic clutch is covered by an enclosure which substantially covers the hydrodynamic circuit and preferably has an opening on the radial outer side through which viscous medium can flow out of the hydrodynamic circuit due to centrifugal force so that this hydrodynamic circuit can be emptied. This opening is preferably provided with a through-flow control in which, for example, the through-flow cross section of the opening is increasingly reduced so that the emptying of the hydrodynamic circuit is slowed down. A through-flow control of this type is basically a flow limiter. It acts in a particularly flexible manner when it is adjustable as continuously as possible via an actuator, e.g., an electromagnet. An alternative possibility consists in through-flow controls which act by means of geometric shaping, for example, by forming the edge defining the opening in the enclosure as a nozzle or a diaphragm. To summarize, the emptying rate and therefore the period of time for deactivating the hydrodynamic clutch can accordingly be determined by means of this through-flow control, while the volume flow at the flow inlet is at least reduced simultaneously. Conversely, an activation of the hydrodynamic clutch by introducing or amplifying a volume flow of viscous medium via the flow inlet can be achieved, preferably with at least partial reduction of flow in the area of the radial outer opening, since the hydrodynamic circuit can accordingly be filled with viscous medium within a time period which can be predetermined.

The enclosure of the hydrodynamic clutch which was mentioned above and which is necessary for operation is preferably used to connect with a crankshaft of the drive, for example, via a toothing, so as to be fixed with respect to relative rotation. The enclosure is therefore guided out of the housing enclosing the clutch device on the drive side, while the rest of the clutch device remains inside the housing. The housing is protected at least substantially against escape of viscous medium by means of a cover and a seal which is provided between the cover and the enclosure which is guided outward on the drive side.

According to another further development, the hydrodynamic clutch is connected via the enclosure with a torsional vibration damper which acts, in turn, on the drive side of the associated friction clutch.

The hydrodynamic clutch can be constructed as a hydraulic clutch with exclusive use of impeller wheel and turbine wheel, but can also be constructed as a hydrodynamic torque converter when a stator wheel is additionally used between the two wheels mentioned above. In the latter case, it is necessary to provide the possibility for supporting the stator wheel relative to the forces brought about by flow between the impeller wheel and turbine wheel; this support is carried out by means of a supporting shaft in the transmission housing of the shift transmission, which supporting shaft is central relative to the axis of rotation of the clutch device.

According to a further development, all friction clutches are connected with a hydraulic pump either by their drive side or by their driven side, so that the friction clutches are given the added function of a pump drive. By means of this hydraulic pump, pressure channels can be generated for building up a control pressure for the respective friction clutch on one hand and flow channels can be generated for building up a volume flow to the friction clutches as well as to the hydrodynamic clutch on the other hand. Pressure chambers in the housing of the clutch device can be acted upon via the pressure channels, specifically, in such a way that a piston of the friction clutch associated with the pressure chamber is deflected against the action of an axial spring, and the friction clutch which is preferably constructed as a multiple-plate clutch is accordingly pressed against a shoulder in that the outer and inner plates are pulled together and the friction clutch is accordingly engaged. When overpressure is built up in one of the pressure channels and accordingly in one of the pressure chambers, a reduction in pressure must be generated simultaneously in the other respective pressure channel and a pressure drop must be generated in the associated pressure chamber, so that another piston associated with the other friction clutch is pulled back into its initial position by the action of another axial spring and the associated friction clutch is therefore disengaged. For the next shifting processes, however, the pressure buildup and pressure drop in the individual pressure channels are reversed. At the same time, the hydraulic pump generates a volume flow which preferably flows through a flow channel radially between the two transmission input shafts, so that at least one of the transmission input shafts, that is, the radial outer transmission input shaft, must be constructed as a hollow shaft which encloses the inner transmission input shaft with radial play to form a flow channel with an annular cross section. A volume flow of viscous medium reaches the housing of the clutch device through this flow channel and arrives, in particular, in the area of extension of the friction clutches, wherein the latter preferably have flow passages in the friction facings associated with the individual plates for the passage of the volume flow. Flow passages of this type may have any shape. A great many different constructions for flow passages of this type are known from the patent literature. According to German reference DE 44 32 624 C1, such flow passages can have a winding shape, while U.S. Pat. No. 5,094,331 shows preferred radial flow passages and U.S. Pat. No. 5,101,953 discloses flow passages between which protuberances are formed in a waffle pattern. The construction of these flow passages is designed in accordance with the purpose for which the friction clutches are to be used.

One of the flow channels leads past the area of extension of the friction clutch to the hydrodynamic clutch and serves to supply the latter—at least occasionally—with a volume flow of viscous medium which serves to activate the hydrodynamic clutch in the manner already detailed above, especially during starting processes. The transmission input shaft enclosing the axis of rotation of the clutch device is constructed as a hollow shaft, so that this flow channel extends centrally. This design is advantageous in a preferred manner when the hydrodynamic clutch is constructed as a hydraulic clutch. However, when the hydrodynamic clutch is constructed as a hydrodynamic torque converter, the flow channel is preferably provided with an annular cross section radially between the hollow, radially innermost transmission input shaft and supporting shaft because of the need to support the stator wheel in the transmission housing of the shift transmission and due to the fact that a supporting shaft extending between a freewheel of the stator wheel and the transmission housing is consequently guided through, preferably centrally.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

Embodiment examples of the invention will be described more fully in the following with reference to the drawings.

DETAILED DESCRIPTION OF THE PRESENTLY PREFERRED EMBODIMENTS

Figure 1:
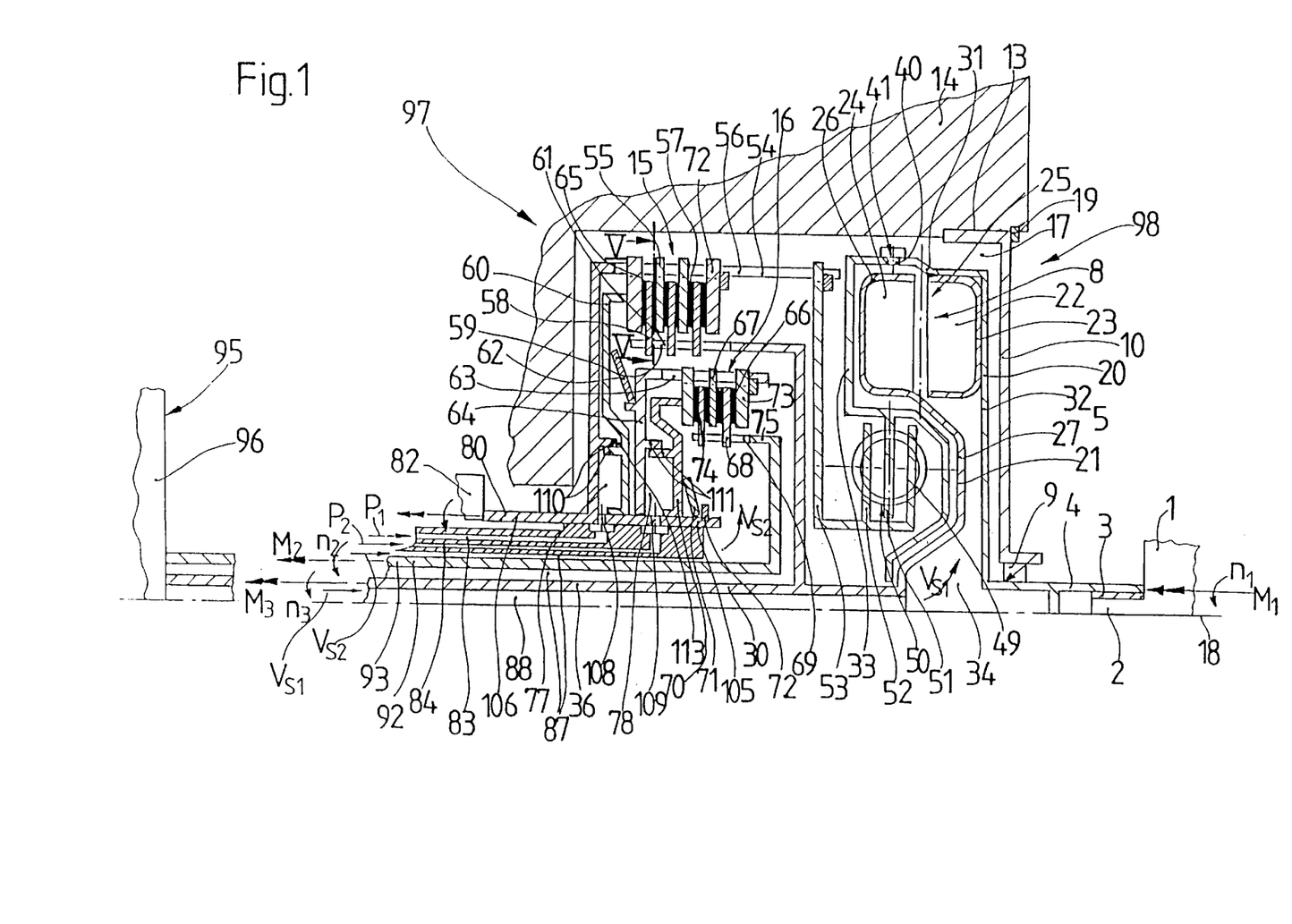
FIG. 1 is a view of the upper half of a clutch device in section with a hydrodynamic clutch in the form of a hydraulic clutch which has a through-flow control and is constructed with friction clutches having plates.

FIG. 1 shows a drive 1 which can be formed by an internal combustion engine of a motor vehicle. This drive 1 is provided with a crankshaft 2 which is connected via a toothing 3 with a hollow shaft 4 of an enclosure 5 for a hydrodynamic clutch 8 so as to be fixed with respect to rotation relative to it. The hollow shaft 4 has a seal 9 which is enclosed in turn by a cover 10 of a housing 14. The cover 10 is recessed into a depression 13 of the housing 14 in the radial outer area and is secured in the axial direction by the axial boundary of the depression 13 at one end and by a counter-holder 19 at the other end. The cover 10 defines a space 17 at its side facing the drive 1 which serves to receive the hydrodynamic clutch 8, mentioned above, and two friction clutches 15, 16. Together with the friction clutches 15, 16, the hydrodynamic clutch 8 forms a clutch device 97 which cooperates with the drive 1 and a shift transmission 95 as the drivetrain 98 of a motor vehicle. The hydrodynamic clutch 8 is rotatable with the friction clutches 15, 16 about a common axis of rotation 18.

Referring again to the hydrodynamic clutch 8, this hydrodynamic clutch 8 is provided with a driving member 20 in the form of an impeller wheel 22 and a driven member 21 formed by a turbine wheel 24, wherein a hydrodynamic circuit 25 is formed by the cooperation of the impeller wheel 22 and turbine wheel 24. The impeller wheel 22 is provided with an impeller shell 23 which is either constructed integral with the enclosure 5 or is fastened thereto.

The turbine wheel 24 cooperating with the impeller wheel 22 has a turbine shell 26 and a turbine base 27 which is connected with the latter so as to be fixed with respect to rotation relative to it. The turbine base 27 is connected with a first transmission input shaft 30 so as to be fixed with respect to rotation relative to it, this first transmission input shaft 30 being constructed as a hollow shaft 36. The reasons for the latter step are explained in detail in the following.

Referring back to the hydrodynamic clutch 8, the enclosure 5 is formed with a radial outer boundary 31 adjoined by walls 32, 33 extending radially inward. The wall 32 is arranged adjacent to the cover 10 and is connected with the hollow shaft 4, mentioned above, so as to be fixed with respect to rotation relative to it. The other wall 33 is formed radially inward up to a gap width of the transmission input shaft 30 and has a hub for controlling a circumferential spring assembly 49 of a torsional vibration damper 50, wherein the circumferential spring assembly 49 is supported at the other end at cover plates 52 which are connected in turn with a first outer plate carrier 54 so as to be fixed with respect to rotation relative to it by means of a web 53 which extends radially outward. The plate carrier 54 forms the drive side 56 of the first friction clutch 15 and serves to receive first outer plates 55 such that they are connected so as to be fixed with respect to rotation relative to one another. Assuming the engaged state, these outer plates 55 cooperate via first friction facings 57 with first inner plates 58 to which the friction facings 57 are fastened. The inner plates 58 are connected in turn with a first inner plate carrier 59 so as to be fixed with respect to rotation relative to it, this first inner plate carrier 59 serving as driven side 61 of the first fiction clutch 15. This inner plate carrier 59 leads radially inward and is connected to the transmission input shaft 30 so as to be fixed with respect to rotation relative to it.

Referring back to the drive side 56 of the first friction clutch 15, its outer plate carrier 54 leads radially inward, where it has an axial offshoot or branch 105 in the direction of the hydrodynamic clutch 8 on one side and an axial branch 106 in the direction of the shift transmission 95 on the other side. The first axial branch 105 is provided with recesses 108, 109 whose function will be discussed later. Meanwhile, the other axial branch 106 is connected with a hydraulic pump 82 and serves as a pump drive 80 for the latter. The torque provided by the drive 1 is therefore conveyed directly to the hydraulic pump 82 via the enclosure 5 of the hydrodynamic clutch, the torsional vibration damper 50 and the outer plate carrier 54 of the first friction clutch 15.

The axial branch 105 extending in the direction of the hydrodynamic clutch serves to receive a second outer plate carrier 63 for the second friction clutch 16 so as to be fixed with respect to rotation relative to it, this second outer plate carrier 63 accordingly acting as drive side 64 for this second friction coupling 16. The outer plate carrier 63 receives outer plates 67 which, assuming the friction clutch 16 is engaged, enter by their friction surfaces into operative contact with friction facings 74 attached to inner plates 68. The latter are, in turn, connected with a second inner plate carrier 69 so as to be fixed with respect to rotation relative to it, this second inner plate carrier 69 serving as driven side 75 of the second friction clutch 16. This inner plate carrier 69 is connected with a second transmission input shaft 92 so as to be fixed with respect to rotation relative to it; like the first transmission input shaft 30, this second transmission input shaft 92 is constructed as a hollow shaft 93 and encloses the first transmission input shaft 30 at a distance radially.

The axial branch 105 of the first outer plate carrier 54 which is directed toward the hydrodynamic clutch 8 receives an axially movable first piston 60 axially between the radially extending part of the first outer plate carrier 54 and the radially extending part of the second outer plate carrier 63. The first friction clutch 15 which is constructed with a first plate stack 65 can be acted upon axially by the radial outer area of this piston 60 for engagement. Farther inward radially, the piston 60 is acted upon by a first axial spring 62 which is supported axially at the other end at the second outer plate carrier 63. The piston 60, with reference to the first friction clutch 15, is held in the disengaged position by this axial spring 62. In the radial inner area, the piston 60, like the adjacent first outer plate carrier 54, is formed with an axial projection 110, wherein these two axial projections 110 of the plate carrier 54 and piston 60 are directed toward one another and are held in radial contact relative to one another. The axial projections 110 accordingly close a pressure chamber 77 at the radial outer side, which pressure chamber 77 adjoins the recess 108 in the axial branch 105 on the radial inside at the other end. This recess 108 is connected in turn with the hydraulic pump 82 via a first pressure channel 83. The pressure channel 83 extends with an annular cross section into the pump drive 80.

A second piston 70 is arranged so as to be axially displaceable axially between the radial area of the second outer plate carrier 63 and the radial area of the second inner plate carrier 69. This second piston 70 serves to engage with its radial outer area for acting upon the second plate carrier 66 of the second friction clutch 16 axially and has an axial projection 111 in its radial middle area, as does the adjoining radial part of the second outer plate carrier 63, wherein these two axial projections 111 adjoin one another radially. These axial projections 11 define a second pressure chamber 78 which extends radially inward up to the adjacent recess 109 in the axial branch 105 which is connected in turn with the hydraulic pump 82 via a second pressure channel 84. This second pressure channel 84, also with annular cross section, is formed in the pump drive 80, namely, with a radial offset relative to the first pressure channel 83. The second piston 70 is loaded n the radial inner area by an axial spring 71 which is supported at the other end at a shoulder 72.

The pump drive 80 which has already been mentioned is constructed as an annular structural component part which engages, with radial offset, around the second transmission input shaft 92 at a distance radially so that a first part of a first flow channel 87 with annular cross section extends radially between the pump drive 80 and the second transmission input shaft 92, while a second part of this first flow channel 87, likewise with an annular cross section, extends radially between the second transmission input shaft 92 and the first transmission input shaft 30. This flow channel 87 connects the hydraulic pump 82 with the friction clutches 15, 16 and serves to conduct a volume flow $VS_2$ into the space 17 of the housing 14. A second flow channel 88 with a disk-shaped cross section is provided radially inside of the second transmission input shaft 30, which is constructed as a hollow shaft 36. This second flow channel 88 connects the hydraulic pump 82 with a flow inlet 34 of the hydrodynamic pump 8 and serves for the through-flow of a volume flow $VS_1$.

The flow inlet 34 is provided at the radial inner side of the enclosure 5 of the hydrodynamic clutch 8 and is formed in that there is no connection between the walls 32, 33 of the enclosure 5. This flow inlet 34 cooperates with a flow outlet 40 which is provided in the radial outer boundary 31 of the enclosure 5 in the form of at least one opening 42. This opening 42 preferably cooperates with a through-flow control 41 which can be constructed in different ways, wherein FIGS. 2 to 4 show a number of embodiment forms.

However, this through-flow control 41 is only shown schematically in FIG. 1.

Figure 2:
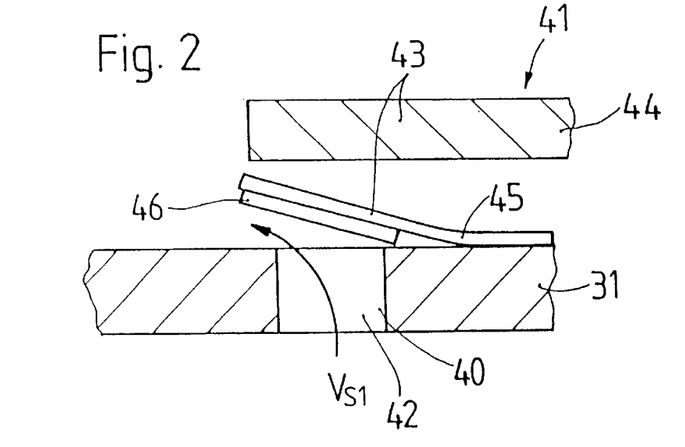
FIG. 2 shows an enlarged detail of a through-flow control acting in dependence on centrifugal force.
Figure 3:
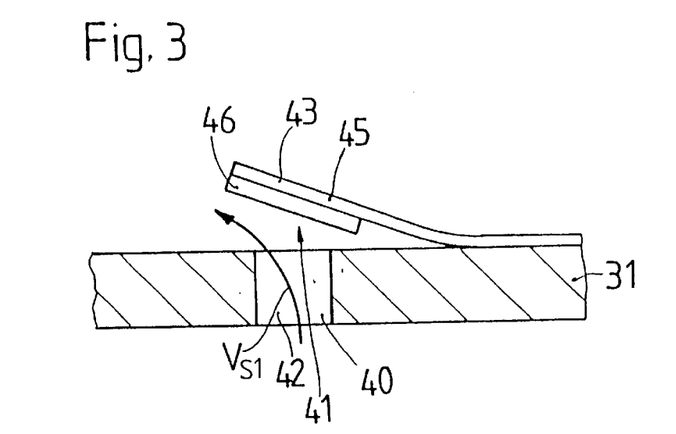
FIG. 3 is similar to FIG. 2 but shows a through-flow control which is adjustable by means of actuators.

FIG. 2 shows, as through-flow control 41, a leaf spring 45 which is fastened radially outside to the boundary 31 of the enclosure 5 and which has a closure 46 at its side facing the opening 42. The free end of the leaf spring 45 cooperates with an actuator 44 in the form of a controllable electromagnet through which a compressive force can be achieved on the leaf spring 45 to reduce the through-flow cross section between the closure 46 and the boundary 31. Accordingly, the through-flow control 41 essentially acts as a flow limiter 43 by means of which a volume flow $VS_1$ of viscous medium exiting via the opening 42 due to centrifugal force can be reduced. The simpler embodiment form according to FIG. 3 serves the same purpose, wherein the closure 46 always releases the opening 42 as the centrifugal force increases in order to increase the volume flow $VS_1$ exiting from this opening 42, which is useful when the hydrodynamic clutch is used chiefly for starting processes which are carried out predominantly at comparatively low rotational speeds.

Figure 4:
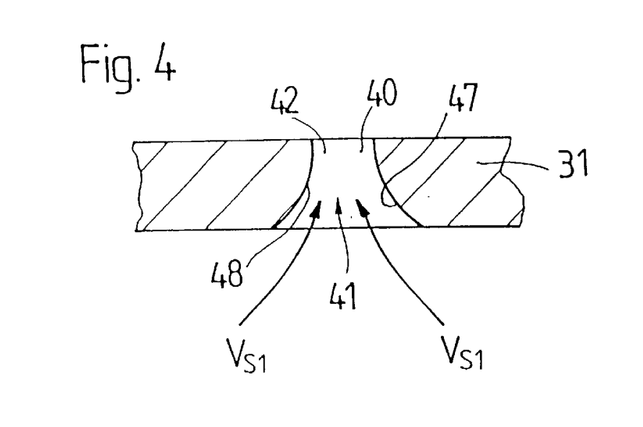
FIG. 4 shows a through-flow control which influences flow.

FIG. 4 shows another embodiment form in which the edge 48 of the opening 42 has a geometric shape 47 in the radial outer boundary 31 of the enclosure 5, for example, in the form of a nozzle. Throttle losses can accordingly be built up.

Figure 5:
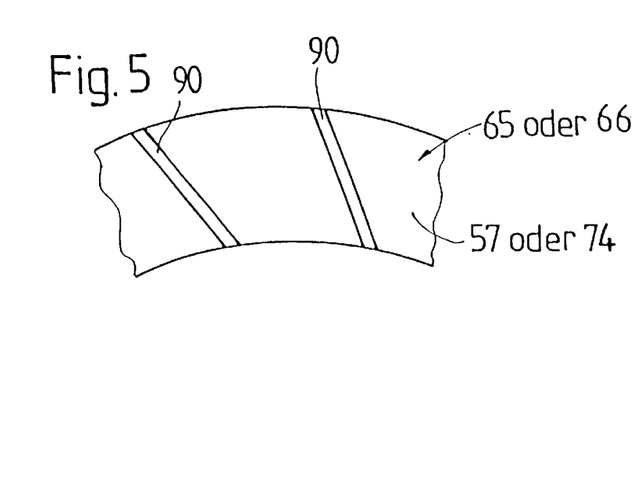
FIG. 5 is a fragmentary view of a face portion of a plate from one of the friction clutches.

FIG. 5 shows a friction facing 57, 74 at one of the plate stacks 65, 66, wherein the friction facing is identically formed at the other plate stack. In this friction facing 57, 74, flow passages 90 are provided for the passage of the volume flow $VS_2$, wherein these flow passages can also have different geometric shapes. For example, reference is had in this connection to DE 44 32 624 C1, cited in the beginning, which discloses friction facings with a winding shape.

Referring back to the transmission input shafts 30, 92, the latter are guided into the transmission housing 96 of the shift transmission 95. The shift transmission 95 which cooperates with a clutch device 97 of the type mentioned above is preferably an automatic shift transmission in which two gears can also be engaged simultaneously, wherein the torque delivered by the drive 1 can be selectively transmitted via the clutch device 97 to one gear speed or the other depending on the operating status of the individual clutches 8, 15, 16 in the clutch device 97. Assuming that a gear is already engaged, the second, desired gear speed can accordingly already be engaged before the shifting process is actually effective. The clutch device 97 operates in the following manner:

When a high torque is required in a starting process, for example, to overcome an obstacle, or when a hill-holder or creep function is required in the motor vehicle, a volume flow $VS_1$ of viscous medium is applied to the second flow channel 88 by corresponding control of the hydraulic pump 82, whereupon this volume flow $VS_1$ enters via the flow inlet 34 of the hydrodynamic clutch 8 and accordingly arrives in the hydrodynamic circuit 25. At the same time, the through-flow control 41 is adjusted in such a way that either no viscous medium or only a comparatively small, predeterminable residual through-flow exits the enclosure 5. The hydrodynamic circuit 25 accordingly fills very quickly with viscous medium and is accordingly enabled to use the movement transmitted by the drive 1 to the impeller wheel 22 via the hollow shaft 4 of the enclosure 5 for driving the turbine wheel 24 hydrodynamically. As soon as rotation is initiated, the latter conveys the received torque to the transmission input shaft 30 via the turbine base 27. The first gear position as well as the reverse gear are preferably allocated to this transmission input shaft 30 because the hydrodynamic clutch 8 is used preferably when high torque is required, particularly when starting; this is why the transmission input shaft 30 connected with the hydrodynamic clutch 8 should preferably be allocated those gear speeds that involve transmission of high torques, that is, consequently, chiefly the two gear speeds mentioned above. Further, it is also possible to allocate the third and fifth gear speeds to this transmission shaft 30 in addition to the two gear positions mentioned above. In contrast, the rest of the gear speeds 2, 4 and 6 are preferably allocated to the other transmission input shaft 92.

Both friction clutches 15, 16 are preferably open as long as the hydrodynamic clutch is in operation. As soon as the above-mentioned difficult operating condition of the motor vehicle is concluded, the use of the hydrodynamic clutch can be dispensed with in favor of reduced slip losses. The hydraulic pump 82 is therefore controlled in such a way that it reduces or even halts the volume flow $VS_1$ supplied via the flow channel 88, while, at the same time, the through-flow control 41 provides for an increasing or even complete release of the opening 42. According to FIG. 2, the electromagnet 44 would accordingly have to be controlled in such a way that the leaf spring 45 and therefore the closure 46 are enabled to open to the maximum extent. As a result of centrifugal force, the viscous medium of the hydrodynamic circuit 25 will then flow off radially outward into the space 17 of the housing 14 via the opening 42, while, from the radial inner side, a supply of viscous medium is absent or is sharply reduced via the flow inlet 34. Accordingly, the hydrodynamic circuit 25 empties very quickly so that the torques that can be transmitted by the latter are negligibly small. The first transmission input shaft 30 is accordingly virtually free of torque, while torque introduced simultaneously by the drive 1 is conducted via the enclosure 5, torsional vibration damper 50 and first outer plate carrier 54 of the friction clutch 15 to the second outer plate carrier 63 of the second friction clutch 16 which is fixed with respect to rotation relative to the first outer plate carrier 54. It should be added that this torque transmission path is also in effect when the hydrodynamic clutch 8 is active and the transmission input shaft 30 is consequently acted upon by torque. In contrast to the abovementioned state, however, the second friction clutch 16 gradually engages as the ability of the hydrodynamic clutch 8 to transmit torque decreases, resulting in decreasing torque at the transmission input shaft 30 with increasing torque at the other transmission input shaft 92. However, in order to save wear on the shift transmission 95 and the two friction clutches 15, 16, the second transmission input shaft 92 should be acted upon by engagement of the second friction clutch 16 only when the torque transmitted to the first transmission input shaft 30 by the first friction clutch 15 and/or the hydrodynamic clutch 8 is already extremely small.

For engaging the second friction clutch 16, the hydraulic pump 82 is controlled in such a way that it acts upon the second pressure channel 84 with an overpressure P2, so that the overpressure P2 reaches the second pressure chamber 78 via the recess 109 in the axial branch 105 of the first outer plate carrier 54. The second piston 70 then moves in the direction of the adjacent plate stack 66 and presses its outer plates 67 and inner plates 68 against one another, this plate stack 66 being supported by its other end at the support 73. As soon as there is a frictional engagement between the outer plates 67 and the inner plates 68, the torque conducted to the second outer plate carrier 63 is conveyed via the plate stack 66 to the second inner plate carrier 69 and accordingly to the second transmission input shaft 92. As soon as this shifting process has been concluded, the next gear speed can already be engaged in the shift transmission 95, namely, gear speed 3 for shifting up or gear 1 for shifting down. As soon as this shifting process has been concluded, the hydraulic pump 82 is switched so that it relieves the second pressure channel and applies an overpressure P1 to the first pressure channel 83. As a result, the overpressure in the second pressure chamber 78 drops so that the second piston 70 can move back into its initial position due to the action of the second axial spring 71. At the same time, the overpressure in the first pressure chamber 77 increases, so that the first piston 60 is displaced in the direction of the first plate stack 65 accompanied by deflection of the axial spring 62 and accordingly produces a frictional connection between the outer plates 55 and the inner plates 58 via the friction facing 57. When the plate stack 65 is loaded axially by the first piston 60, this plate stack 66 is supported by the other end at the shoulder 72. The torque which is always present at the first outer plate carrier 54 is then transmitted again to the transmission input shaft 30 via the first inner plate carrier 59. The friction clutches 15, 16 are normally sufficient for all further shifting processes during driving. Accordingly, the hydrodynamic clutch 8 is only activated again when the problematic operating conditions mentioned above are introduced on the driver's side. During operation of the friction clutches 15, 16, volume flow $VS_2$ is continuously applied to the space 17 of the housing 14 by the hydraulic pump 82. This serves principally for passage through the flow passages 90 in the friction linings 57 of the first friction clutch 15 or in the friction facings 74 of the second friction clutch 16. When the viscous medium forming volume flow $VS_2$ passes through the respective flow passages 90, the friction facings 57, 74 as well as the allocated friction surfaces of the adjacent outer plates 55, 67 are cooled. The heat absorbed in this way by the viscous medium is carried out of the space 17 and, therefore, out of the housing 14 of the clutch device 97 as the volume flow drains off and, where appropriate, passes through a liquid cooler, not shown. In this way, a change in the friction coefficient caused by temperature is effectively prevented at the friction facings 57, 74.

Figures 6, 7:
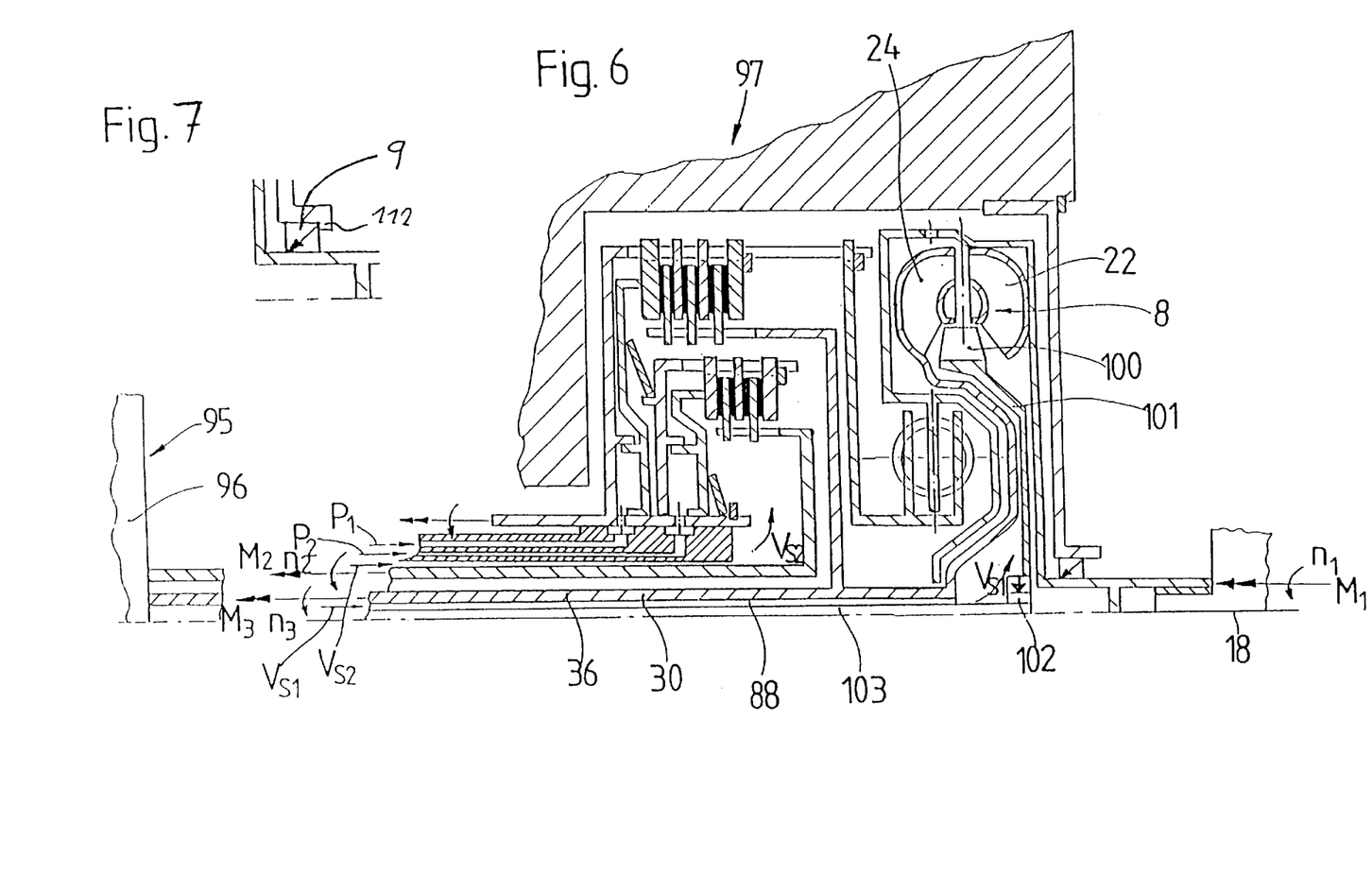
FIG. 6 is similar to FIG. 1 but showing a hydrodynamic torque converter as hydrodynamic clutch.
FIG. 7 shows an enlarged detail illustrating a preferred possibility for securing a seal acting between a cover and a shaft.

FIG. 6 shows another embodiment form of the clutch device 97 according to the invention; this clutch device 97 differs from the clutch device described so far only in that the hydrodynamic clutch 8 is constructed with a stator wheel 100 axially between the impeller wheel 22 and turbine wheel 24. In view of the stator wheel 100, the hydraulic clutch described up to this point now becomes a hydrodynamic torque converter. The stator wheel 100 is arranged, via a radially extending stator wheel hub 101, on a freewheel 102 which is formed in the conventional way and is therefore not described more fully. The freewheel 102 in turn fits on a supporting shaft 103 which extends radially inside the transmission input shaft 30 formed as a hollow shaft 36, namely, into the transmission housing 96 of the shift transmission 95, where this supporting shaft 103 is preferably supported at the transmission housing 96, particularly at its rear side remote of the clutch device 97. Due to the radial distance by which the transmission input shaft 30 encloses the supporting shaft 103, the second flow channel 88 which is needed for introducing the volume flow $VS_1$ from the hydraulic pump 82 into the flow inlet 34 of the hydrodynamic clutch 8 extends with annular cross section radially between these two shafts 30 and 103. Regarding the supporting shaft 103, it should be added that it preferably extends in the center of the clutch device 97, so that the center axis of the supporting shaft 103 is identical to the axis of rotation 18 of the drive 1, clutch device 97 and shift transmission 95, that is, to the axis of rotation 18 of the drivetrain 98.

FIG. 7 illustrates a preferred arrangement for securing the seal 9 acting between the cover 10 and the hollow shaft 4, namely, by means of at least one retaining portion 112 which projects radially inward into the radial area of the seal 9 at a radial inner edge area of the cover 10. The retaining portion 112 can be pressed material, a bent portion of the cover edge, or the like. The seal 9 can also function as a bearing.

It should be added that the clutch device formed by the two friction clutches 15, 16 and the hydrodynamic clutch 8 can be supported at the transmission input shafts 30, 92, especially at least at the radial outer hollow shaft 92. For this purpose, suitable pivot bearings can be provided between the hollow shaft 92 on one side and the structural component part having the pressure channels 83, 84 and the axial branch 105 and/or axial branch 106 on the other side.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. Clutch device for connecting the drive of a motor vehicle with a multiple-speed shift transmission, said clutch device comprising at least two friction clutches, each clutch having a driven side, the driven side of each clutch being connected with an associated transmission input shaft of the shift transmission, said at least two friction clutches being engaged or disengaged independently of each other, in which at least a first one of said two friction clutches can be put into a working connection at a driving side thereof with a driving member of a hydrodynamic clutch which can be activated, under motor vehicle drivetrain predetermined operating conditions to transmit torque output of the drive, a driven side of the said first one of said friction clutches, and a driven member of the hydrodynamic clutch being connected with the transmission input shaft associated with the first one of said friction clutches.

2. Clutch device according to claim 1, in which the hydrodynamic clutch is connected by its driven member with the first one of said friction clutches.

3. Clutch device according to claim 1, in which the first one of said friction clutches is arranged relative to a shaft axis with a radially outwardly offset positioning with respect to a positioning of a second of said friction clutches.

4. Clutch device according to claim 3, in which the hydrodynamic clutch is connected via its driven member with the radially outwardly offset friction clutch.

5. Clutch device according to claim 4, the hydrodynamic clutch having an impeller wheel as a driving member, and a turbine wheel as said driven member for forming a hydrodynamic circuit, in which the impeller wheel is part of an enclosure for the hydrodynamic clutch which enclosure has a flow inlet for inletting viscous medium to the hydrodynamic circuit, and a flow outlet for outletting vicous medium from said hydrodynamic circuit.

6. Clutch device according to claim 5, in which the enclosure has a radial outer boundary for the hydrodynamic circuit, said hydrodynamic circuit having opposite sides defined by walls which lead radially inward from the boundary spaced radial inner ends of said walls defining said flow inlet.

7. Clutch device according to claim 6, in which the enclosure has at least one opening at its radial outer boundary acting as the flow outlet.

8. Clutch device according to claim 7, comprising a through-flow control for controlling volume flow of the viscous medium through the opening.

9. Clutch device according to claim 8, in which the through-flow control has a through-flow limiter.

10. Clutch device according to claim 8, in which the through-flow control comprises geometric shaping at an edge of the radial outer boundary of the enclosure, said edge defining the opening.

11. Clutch device according to claim 5, in which the enclosure effects a working connection between the motor vehicle drive and the hydrodynamic clutch.

12. Clutch device according to claim 6 in which enclosure has a drive-side wall for effecting a working connection between the motor vehicle drive and the hydrodynamic clutch, said drive-side wall comprising part of a housing enclosing the hydrodynamic clutch and the friction clutches.

13. Clutch device according to claim 12, in which at least one seal is provided between the housing and the enclosure.

14. Clutch device according to claim 5, in which the turbine wheel has a turbine shell and a turbine base extending radially inwardly from the turbine shell, the hydrodynamic clutch driven member extending radially inwardly from the turbine base to a connection thereof with the transmission input shaft associated with the first one of said friction clutches.

15. Clutch device according to claim 11, in which the enclosure of the hydrodynamic circuit is connected with a driving side of the radially outermost friction clutch for producing the working connection between the motor vehicle drive and hydrodynamic clutch.

16. Clutch device according to claim 15, in which the working connection between the enclosure and the radially outermost friction clutch is effected with a torsional vibration damper.

17. Clutch device according to claim 1, in which hydrodynamic clutch has a stator wheel between the impeller wheel and turbine wheel, the stator wheel being supported via a central supporting shaft supported in a transmission housing of the shift transmission.

18. Clutch device according to claim 17, in which that the stator is received on a free wheel fitted on said wheel supporting shaft.

19. Clutch device according to claim 1, characterized in that the drive side of at least one of said friction clutches is connected with a hydraulic pump to act as a pump drive.

20. Clutch device according to claim 19, in which said friction clutches are wet-type friction clutches, the clutch device including pressure channels in communication with said hydraulic pump through which hydraulic medium can be supplied for building up a control pressure for the respective friction clutches.

21. Clutch device according to claim 20, in which the pressure channels open into a housing in which the friction clutches are received.

22. Clutch device according to claim 21, in which the housing has pressure chambers with which of the pressure channels communicate.

23. Clutch device according to claim 22, in which the pressure chambers each are defined at an end thereof by an axially movable piston of one of the friction clutches.

24. Clutch device according to claim 23, in which each piston is movable into a working connection with a stack of clutch plates, the stack of clutch plates being supported on a support shoulder at a stack end opposite an end thereof against which the piston moves in working connection.

25. Clutch device according to claim 19, in which the hydraulic pump can be used via flow channels for supplying a volume flow of viscous medium to at least one of said friction clutches.

26. Clutch device according to claim 25, in which the flow channels, open into a housing in which the friction clutches are received.

27. Clutch device according to claim 25, in which the friction clutches each include a stack of clutch plates, at least some of said clutch plates having friction facings, there being flow passages in said friction facings for the viscous medium volume flow supplied from the flow channels.

28. Clutch device according to claim 21, in which the pressure channels and the flow channels extend at a radial offset relative to one another from a fixed axis.

29. Clutch device according to claim 28, in which pressure channels are provided in the pump drive.

30. Clutch device according to claim 1, in which at least one of the transmission input shafts is constructed as a hollow shaft which encloses a other of the transmission input shafts.

31. Clutch device according to claim 30, in which the transmission input shafts are arranged at a radial offset relative to one another from a fixed axis and form at least one flow channel therebetween.

32. Clutch device according to claim 29, in which the pump drive defines another flow channel with a radial offset relative to the transmission input shaft adjacent to said pump drive.

33. Clutch device according to claim 1, in which the driven side of said first one of said friction clutches is connected with a driving side of a other of said friction clutches.

34. Clutch device according to claim 33, in which the driven side of said other friction clutch is connected with an associated transmission input shaft driven independently of the transmission input shaft associated with the first friction clutch.

35. Clutch device according to claim 19, in which a driving side of said other friction clutch is connected with the pump drive and has recesses for connecting pressure channels with pressure chambers of pistons of the friction clutches.

36. Clutch device according to claim 23, in which the pistons can be deflected against the action of axial springs when control pressure is applied to the pressure chambers.

* * * * *